Feb. 1, 1938.   E. A. MURPHY ET AL   2,106,808
PROCESS FOR PRODUCING POROUS SHEETS OF RUBBER
Filed Nov. 15, 1935
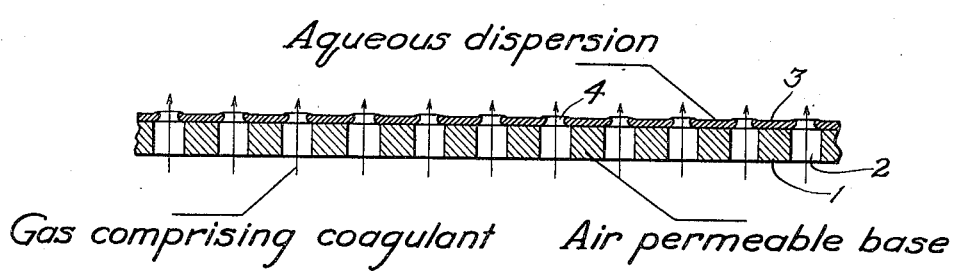
INVENTORS
EDWARD ARTHUR MURPHY
STANLEY DOUGLAS TAYLOR.
BY
ATTORNEYS Patented Feb. 1, 1938

2,106,808

UNITED STATES PATENT OFFICE 2,106,808

PROCESS FOR PRODUCING POROUS SHEETS OF RUBBER

Edward Arthur Murphy, Wylde Green, Birmingham, and Stanley Douglas Taylor, Sutton Coldfield, England, assignors to Dunlop Rubber Company Limited, London, England, a company of Great Britain Application November 15, 1935, Serial No. 49,972
In Great Britain December 22, 1934

6 Claims. (Cl. 18—58)

This invention comprises improvements in or relating to a process for the production of goods of or containing rubber or similar material, and is more particularly concerned with the production of goods of the aforesaid kinds which are porous to gases and vapours.

It is known to produce goods of or containing rubber having a multitude of minute perforations which in the unstretched goods are scarcely visible to the naked eye, but which are clearly visible under low power magnification, that is to say, having an average diameter of 0.01 to 0.1 m. m.

One process which has been proposed for producing such goods comprises applying a latex composition to an air impermeable deposition backing having cavities or pits in the surface thereof, care being taken that the air present in the cavities or jets is substantially retained during the application of the latex composition and causing the entrapped air to expand by application of heat while the aforesaid composition is undergoing partial or complete coagulation.

Another process which has been proposed for producing goods of the aforesaid kinds comprises applying a rubber composition, particularly a rubber latex composition, to a perforated deposition backing or form having holes in the deposition surface as desired through which a gas may be forced, and forcing a gas through said holes and through the rubber composition until the aforesaid composition has undergone partial or complete coagulation.

The object of the present invention is an improved method for the production of sheeting and rubberized fabrics which are porous to gases and vapours.

According to our invention, a process for producing goods of or containing rubber or the like which are porous to gases and vapours comprises applying an aqueous dispersion of the kind hereinafter specified to a backing or deposition surface through which a gas may be forced, and forcing a coagulating gas or vapour through said deposition or backing surface and through the layer of rubber composition applied.

The deposition surface or backing may be of any suitable material provided with pores or openings of the desired size and spacing. For example, a fabric of selected fineness of weave and thread may be employed.

If fabric is employed as the porous deposition backing or surface, the coagulating gas or vapour passes through the interstices of the fabric, coagulates the latex mixing on its passage through it and at the same time forms minute perforations in the latex mixing undergoing partial or complete coagulation. In this way is produced a fabric proofed with a finely porous layer of latex rubber which may be vulcanized in known manner. If a porous rubber sheeting is required the layer of rubber produced is stripped from the fabric, which preferably has been first suitably treated so as to permit easy stripping to take place.

The emulsions or dispersions of rubber or the like comprise those consisting of rubber, guttapercha, balata or similar vegetable resins occurring naturally or in vulcanized condition or artificially obtained. Such artificial aqueous dispersions may include those of coagulated rubber, vulcanized rubber, waste or reclaim.

If desired, any of the aforementioned dispersions may be used alone or in admixture with one another.

Any of the aforesaid dispersions may contain the usual known compounding and vulcanizing ingredients and/or may be in the first instance in concentrated form.

Concentrates such as are obtained in Patent No. 1,846,164 and British Patent No. 219,635, to which may be added any one or more of the usual known compounding ingredients may also be employed.

Furthermore, the aforesaid dispersions may be admixed with materials or reagents which make rubber water-repellent. These materials are solid organic materials which have a high angle of contact with respect to water, as for example, the higher members of the homologous series i. e. paraffins, esters, fatty acids, alcohols; such substances as zinc stearate, magnesium stearate i. e. the solid salts of the fatty acids, chlorinated compounds such as halowax, or other halogenated hydrocarbons.

An example of carrying the invention into effect is as follows: Fabrics of the type commonly used in the waterproof garment trade, for example, Indiana or gabardine are spread with a latex mixing according to the normal known spreading processes. The fabric bearing on the one surface a thin layer of as yet uncoagulated latex compound is then passed over a fish-tailed nozzle or series of nozzles through which issues under pressure air charged with acetic acid vapour, conditioned by bubbling through an aspirating device containing concentrated acetic acid. The fabric is in contact with the nozzle.

The manner in which the process is conducted is illustrated diagrammatically or conventionally on a greatly magnified scale in the accompanying drawing in which an air permeable base which may be a fabric or other base having pores or openings, is covered with a layer 3 of an aqueous dispersion such as a suitably compounded latex, and air or other gas containing a coagulant, such as acetic acid vapors, is blown upwardly through the openings or pores 2, forming openings or pores 4 in the layer of latex 3 and immediately coagulating the latex or dispersion about the openings. It will be understood that the drawing merely illustrates the process in a conventional or diagrammatic manner and that the construction of the base may be other than that illustrated. For example, it may be formed of interwoven warp and woof threads in the case of a fabric, the relative dimensions of openings, their spacing and the thickness of the base may be different, as also the thickness of the latex or dispersion layer.

The vapour passes through the interstices of the fabric, coagulates the latex compound on its passage through it, at the same time forming a small hole where it issues. The result is a fabric proofed with a finely porous layer of latex rubber which may be vulcanized in known manner.

Having now particularly described our invention, we claim—

1. A process for producing porous rubber sheets which comprises applying a layer of an aqueous dispersion of rubber to a backing permeable to gases and forcing a gas comprising a coagulating reagent in minute separated streams through said dispersion.

2. A process for producing porous sheet rubber which comprises forming a layer of uncoagulated aqueous dispersion of rubber and forcing through said rubber layer of dispersion separated fine streams of a gas comprising a coagulating reagent.

3. The process of claim 2, in which the gas is air and the coagulant is acetic acid.

4. A process for producing a porous rubber sheet which comprises forming a layer of uncoagulated aqueous rubber dispersion on a fabric permeable to gases and blowing a gas containing a coagulating reagent through said fabric and the layer of dispersion thereon.

5. A process for producing a porous rubber sheet which comprises forming a layer of uncoagulated aqueous rubber dispersion on a fabric permeable to gases and blowing a gas containing a coagulant through said fabric and the layer of dispersion thereon and stripping the resultant coagulated layer from said fabric.

6. A process for producing porous rubber sheets which comprises applying a layer of an aqueous dispersion of rubber to a backing permeable to gases and causing a gas comprising a coagulating reagent to pass from said backing through said layer in separate paths to form separated passageways therethrough.

EDWARD ARTHUR MURPHY.
STANLEY DOUGLAS TAYLOR.